US009923608B2

(12) United States Patent
Axmon et al.

(10) Patent No.: US 9,923,608 B2
(45) Date of Patent: Mar. 20, 2018

(54) PROCESSING UPLINK SIGNALS IN HIGH SPEED SCENARIO

(71) Applicant: Telefonaktiebolaget L M Ericsson (publ), Stockholm (SE)

(72) Inventors: Joakim Axmon, Kävlinge (SE); Magnus Larsson, Sollentuna (SE); Torgny Palenius, Barsebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/911,434

(22) PCT Filed: Jan. 11, 2016

(86) PCT No.: PCT/EP2016/050354
§ 371 (c)(1),
(2) Date: Feb. 10, 2016

(87) PCT Pub. No.: WO2017/032462
PCT Pub. Date: Mar. 2, 2017

(65) Prior Publication Data
US 2017/0257149 A1    Sep. 7, 2017

Related U.S. Application Data

(60) Provisional application No. 62/209,002, filed on Aug. 24, 2015.

(51) Int. Cl.
| | |
|---|---|
| *H04B 7/02* | (2017.01) |
| *H04B 7/01* | (2006.01) |
| *H04B 7/08* | (2006.01) |

(52) U.S. Cl.
CPC ............... *H04B 7/01* (2013.01); *H04B 7/086* (2013.01)

(58) Field of Classification Search
CPC ... H04W 84/005; H04W 88/02; H04W 88/08; H04W 16/26; H04W 4/027; H04W 88/04;
(Continued)

(56) References Cited

U.S. PATENT DOCUMENTS

2013/0195005 A1* 8/2013 Al-Shalash ........... H04W 36/16
370/315

FOREIGN PATENT DOCUMENTS

| EP | 2486753 A1 | 8/2012 |
|---|---|---|
| WO | 2011043705 A1 | 4/2011 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, 1-83.
(Continued)

*Primary Examiner* — Rahel Guarino
(74) *Attorney, Agent, or Firm* — Murphy, Bilak & Homiller, PLLC

(57) ABSTRACT

A network node is connected to a plurality of antenna nodes that are located along a path where a plurality of wireless communication devices are located. The antenna nodes are controlled (302) to maintain reception radio lobes substantially along the path such that the wireless communication devices can communicate with the network node via the reception radio lobes. From a detected (304) radio frequency signal, a determination (306) is made that a UE belongs to a group of UEs having common Doppler radio frequency characteristics. This determination then enables processing (308) of the received signal involving the common Doppler characteristics.

23 Claims, 5 Drawing Sheets

(58) Field of Classification Search
CPC ..... H04W 72/048; H04W 64/00; H04W 8/26; H04W 84/045; H04W 88/06; H04W 88/10; H04W 84/042
See application file for complete search history.

(56) References Cited

OTHER PUBLICATIONS

Unknown, Author, "A New Cyclic Shift Restriction Set for Very High Speed Cells", Alcatel Lucent, 3GPP TSG-RAN WG4 Meeting #76, R4-154364, Beijing, China, Aug. 24-28, 2015, 1-7.

Unknown, Author, "Evaluation of Unidirectional RRH Arrangement for HST SFN", Ericsson, 3GPP TSG RAN WG4 Meeting #76, R4-154520, Beijing, China, Aug. 24-28, 2015, 1-3.

Unknown, Author, "Further Analysis of PRACH Using Unidirectional Deployment", Ericsson, 3GPP TSG-RAN WG4 Meeting #76, R4-154620, Beijing, China, Aug. 24-28, 2015, 1-4.

Unknown, Author, "Link Simulation—Coverage by RRH Arrangements for HST SFN", Ericsson, 3GPP TSG RAN WG4 Meeting #76, R4-155132, Beijing, China, Aug. 24-28, 2015, 1-5.

Unknown, Author, "Modified RRH Arrangement for HST SFN", Ericsson, 3GPP TSG RAN WG4 Meeting #76, R4-154516, Beijing, China, Aug. 24-28, 2015, 1-13.

Unknown, Author, "TP Unidirectional RRH Arrangement", Ericsson, 3GPP TSG RAN WG4 Meeting #76, R4-154518, Beijing, China, Aug. 24-28, 2015, 1-5.

Unknown, Author, "Unidirectional RRH Arrangement for HST SFN", Ericsson, 3GPP TSG RAN WG4 Meeting #76bis, R4-155743, Sophia Antipolis, France, Oct. 12-16, 2015, 1-11.

Unknown, Author, "Way Forward on Unidirectional RRH Arrangement", Ericsson/Telecom Italia, 3GPP TSG-RAN WG4 Meeting #76, R4-155157, Beijing, China, Aug. 24-28, 2015, 1-3.

Lin, Kun-De et al., "Communications and Entertainment Onboard a High-Speed Public Transportation System", IEEE Wireless Communications, Feb. 2002, 84-89.

Zhou, Yiqing, "Radio Environment Map Based Maximum A Posteriori Doppler Shift Estimation for LTE-R", IEEE International Workshop on High Mobility Wireless Communications, Beijing, Nov. 1-3, 2014, 5.

\* cited by examiner

PROCESSING UPLINK SIGNALS IN HIGH SPEED SCENARIO

TECHNICAL FIELD

Embodiments herein relate to wireless communication and more specifically to uplink signal processing control in a scenario where wireless communication devices are moving at high speeds along a path.

BACKGROUND

Wireless communication systems, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project (3GPP) work is being done regarding possible enhancements to radio resource management, RRM, performance in high speed train (HST) environments. The justification is that there are railways such as Japan Tohoku Shinkansen (running at 320 km/h), German ICE (330 km/h), AGV Italo (400 km/h), and Shanghai Maglev (430 km/h) at which vehicles travel at greater speed than 300 km/h and where there is demand for using mobile services.

For example, a new Remote Radio Head (RRH) arrangement for dedicated Single Frequency Network (SFN) High Speed Train (HST) scenario has been proposed in 3GPP; see e.g. 3GPP contribution R4-154518. This arrangement has shown to significantly improve the throughput for a wireless communication device traveling at speeds up to at least 600 km/h, by stabilizing the Doppler shift experienced by the wireless communication device (e.g. UE) and thus the Doppler shift experienced by a network node (e.g. a radio base station such as a eNodeB in a long term evolution (LTE) system) on the uplink. See for example 3GPP contribution R4-154520. Besides the stabilized frequency offsets experienced by wireless communication devices and network nodes with which wireless communication devices communicate via RRH's, it has also been shown that this RRH arrangement results in negligible inter-carrier interference (ICI) which results in a higher signal to interference ratio (SIR), and low impact of fading, all together leading to a higher carrier to interference and noise ratio (CINR) than otherwise possible. This in turn allows higher modulation orders and less robust encoding to be used, i.e. higher modulation and coding schemes (MCS) can be used. Hence, the system throughput is improved. A thorough analysis can be found in 3GPP contribution R4-154516.

A scenario as discussed above may comprise cells maintained by multiple RRHs along a railway track, with downlink transmission (DLTX) antennas/radio lobes and uplink reception (ULRX) antennas/radio lobes, respectively, pointing in the same direction. This is illustrated in FIG. 1, where a wireless communication device 101, e.g. an UE, is onboard a west moving high speed train 104 on a railway track 151. A group of wireless communication devices 161, e.g. a plurality of UEs and/or MTC devices, are also onboard the west moving high speed train 104 on the railway track 151.

Another group of wireless communication devices 163, similar to the group 161 in the form of, e.g., a plurality of UEs and/or MTC devices, are onboard an east moving high speed train 106 on a railway track 153. Yet another group of wireless communication devices 165 is located not on any of the trains 104, 106 but beside the tracks 151, 153. Wireless communication devices in this group 165 are moving at very low speeds (in comparison with the high speed at which the trains 104, 106 are moving) or they may even be stationary, e.g. due to the fact that users of wireless communication devices in the group 165 are waiting at a station for any of the trains 104, 106.

A first antenna node 110, which may be in the form of a RRH, maintains radio lobes including a transmission radio lobe 111, i.e. a downlink (DL) transmission (TX) DLTX lobe, and a reception radio lobe 112, i.e. an uplink (UL) reception (RX) ULRX lobe. Similarly, a second antenna node 120 maintains radio lobes including a transmission radio lobe 121, i.e. a DLTX lobe, and a reception radio lobe 122, i.e. an ULRX lobe. Similarly, a third antenna node 130 maintains radio lobes including a transmission radio lobe 131, i.e. a DLTX lobe, and a reception radio lobe 132, i.e. an ULRX lobe. As FIG. 1 illustrates, the transmission radio lobes 111, 121, 131 of the respective antenna nodes 110, 120, 130 are in this example all in one and a same direction, i.e. due west, and the reception radio lobes 112, 122, 132 of the respective antenna nodes 110, 120, 130 are also all in one and a same direction, i.e. due west. As introduced above, the unidirectional RRH arrangement for a SFN network in HST scenario illustrated in FIG. 1 may be such that multiple users are onboard each respective train 104, 106. All such user's UEs onboard the respective trains 104, 106 are experiencing and displaying the same Doppler shift characteristics.

There are drawbacks associated with prior art handling of radio frequency (RF) signals received in ULRX in an antenna node such as a RRH. Account has to be made for frequency offsets due to Doppler shifts on the ULRX for random access (RA) as well as for reception of, e.g., a physical uplink control channel (PUCCH) and/or a physical uplink shared channel (PUSCH).

For RA, frequency offsets may cause missed detection and false detections due to that the subcarrier spacing is smaller for the physical random access channel (PRACH) preamble than for other physical channels; 1.25 kHz versus 15 kHz. Hence, a frequency offset larger than ±0.5×1.25 kHz leads to that a PRACH preamble signal becomes shifted one or more subcarrier positions. This has a negative impact on the PRACH detection performance. For that reason, a restricted set of PRACH sequences has been introduced in prior art versions of the standard (3GPP TS 36.211 V8.9.0). The motivation has been that by narrowing down the PRACH sequences to look for, missed detections and false detections can be reduced. Recently it has been suggested to modify the set of allowed PRACH preambles even further (see 3GPP contribution R4-154364). This solution will only be available for new wireless communication devices supporting the new preamble set. The old wireless communication devices are unable to make use of this even further restricted set of PRACH sequences and, consequently, will still have problems to access the network, and will still cause problems for the network to accurately determine the correct identity of the wireless communication device carrying our random access.

For uplink physical control and data channels, an unaccounted frequency offset leads to leakage between subcarriers, i.e., inter-carrier interference, when the received symbols are demodulated. This degrades the sensitivity of the UL receiver and hence negatively impacts the system performance.

A network node that always searches over all possible PRACH sequence shifts and tries to estimate the frequency offset of each and every UE will have a significant workload and will additionally increase the rate of false PRACH detections.

SUMMARY

In view of the above, an object of the present disclosure is to overcome or at least mitigate at least some of the drawbacks related to prior art HST scenarios where unidirectional reception radio lobes are used.

This is achieved in a first aspect by a method performed by a network node. The network node is connected to a plurality of antenna nodes that are located along a path where a plurality of wireless communication devices are located. The method comprises controlling the antenna nodes to maintain reception radio lobes substantially along the path such that the wireless communication devices can communicate with the network node via the reception radio lobes. The method comprises detecting a radio frequency, RF, signal and determining that the detected RF signal originates from a wireless communication device of a specific subset among the plurality of wireless communication devices. The specific subset comprises wireless communication devices that are associated with a common Doppler radio frequency characteristic. The detected RF signal is processed; the processing comprising a utilization of the Doppler radio frequency characteristic that is associated with the specific subset of wireless communication devices.

In other words, a determination is made that a UE belongs to a group of UEs having common Doppler radio frequency characteristics. This determination then enables an application of counter-measures, if needed, for the common Doppler characteristics for all UEs already identified or yet-to-be identified to belong to that particular group.

Hence, a more structured approach is provided that takes into account the special circumstances for a network deployment such as that illustrated in FIG. 1 and enables, e.g., a minimization of false PRACH detections arising from unnecessary large search space with respect to hypothesized Doppler-induced PRACH sequence shifts, a reduction of missed PRACH detections due to collisions in contention based RA, while at the same time keeping the network node processing complexity at a reasonable level.

In some embodiments, the determination that the detected RF signal originates from a wireless communication device of a specific subset may comprise analysing the detected RF signal in terms of at least a frequency envelop and in some embodiments, the determination that the detected RF signal originates from a wireless communication device of a specific subset comprises utilizing a-priori information available to the network node.

Some embodiments comprise additional operations that further specify examples of how the subsets, i.e. groups, of wireless communication devices may be defined. Such embodiments may comprise a determination of a respective motion value representative of motion of at least one subset of wireless communication devices. Based on these respective motion values, a respective Doppler radio frequency characteristic is calculated that is representative of the at least one subset of wireless communication devices. The respective Doppler radio frequency characteristic is then associated with the at least one subset of wireless communication devices.

In some embodiments, the determination of a respective motion value may comprise determining a forward motion value representative of motion, in a forward direction along the path, of a forward moving subset of wireless communication devices.

In some embodiments, the determination of a respective motion value may comprise determining a reverse motion value representative of motion, in a reverse direction opposite the forward direction along the path, of a reverse moving subset of wireless communication devices.

In some embodiments, the determination of a respective motion value may comprise determining a third motion value representative of non-motion of a non-moving subset of wireless communication devices. A definition of non-motion is to be understood as including motion at a low speed, i.e. low speed in relation to a speed of, e.g., a high speed train as discussed above. For example, walking speed is to be considered as a low speed.

The determination, in the embodiments where motion values are determined, may comprise obtaining the respective motion value from predetermined information available to the network node. This predetermined information may comprise information associated with geographic locations of antenna nodes in relation to the path.

Alternatively or additionally, in the embodiments where motion values are determined, the determination of a respective motion value may comprise analysing detected RF signals, comprising an analysis of frequency characteristics.

The processing of the detected RF signal may in various embodiments comprise frequency compensating during PRACH detection by any of frequency translation prior to demodulation, and rotation of PRACH sequences.

In other embodiments, the processing of the detected RF signal may comprise frequency compensating during processing of any of PUCCH and PUSCH by any of frequency offset compensation prior to demodulation and frequency offset compensation subsequent to demodulation.

In another aspect there is provided a network node configured to be connected to a plurality of antenna nodes that are located along a path where a plurality of wireless communication devices are located. The network node comprises input/output circuitry, a processor and a memory. The memory contains instructions executable by said processor whereby said network node is operative to:

control the antenna nodes to maintain reception radio lobes substantially along the path such that the wireless communication devices can communicate with the network node via the reception radio lobes, detect a radio frequency, RF, signal, determine that the detected RF signal originates from a wireless communication device of a specific subset among said plurality of wireless communication devices, said specific subset comprising wireless communication devices that are associated with a common Doppler radio frequency characteristic, and process the detected RF signal, said processing comprising a utilization of said Doppler radio frequency characteristic that is associated with said specific subset of wireless communication devices.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 2:
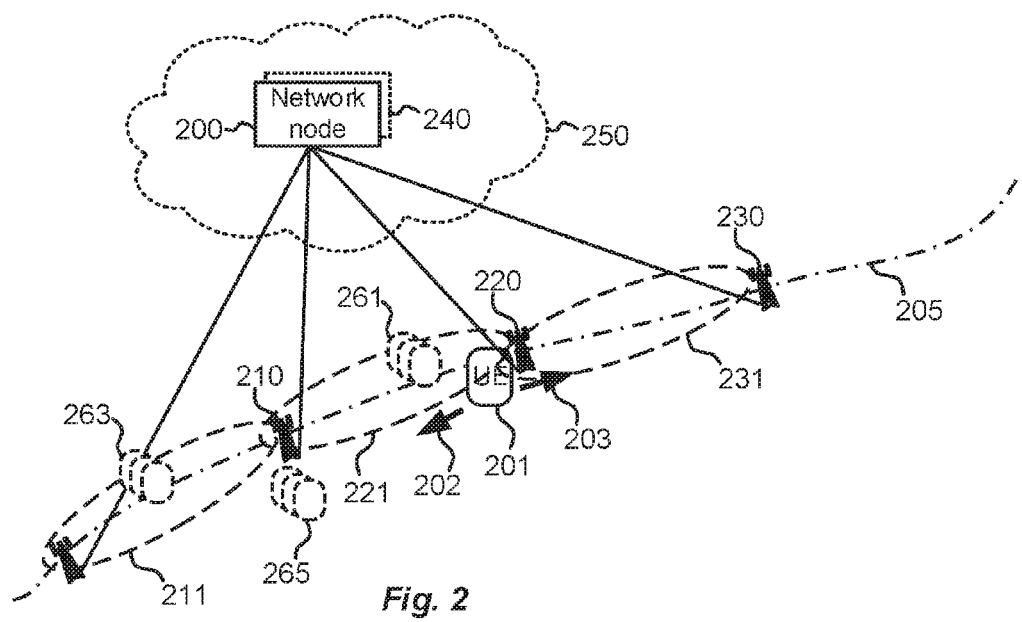
FIG. 2 schematically illustrates a network node, antenna nodes and a wireless communication device.
Figure 3:
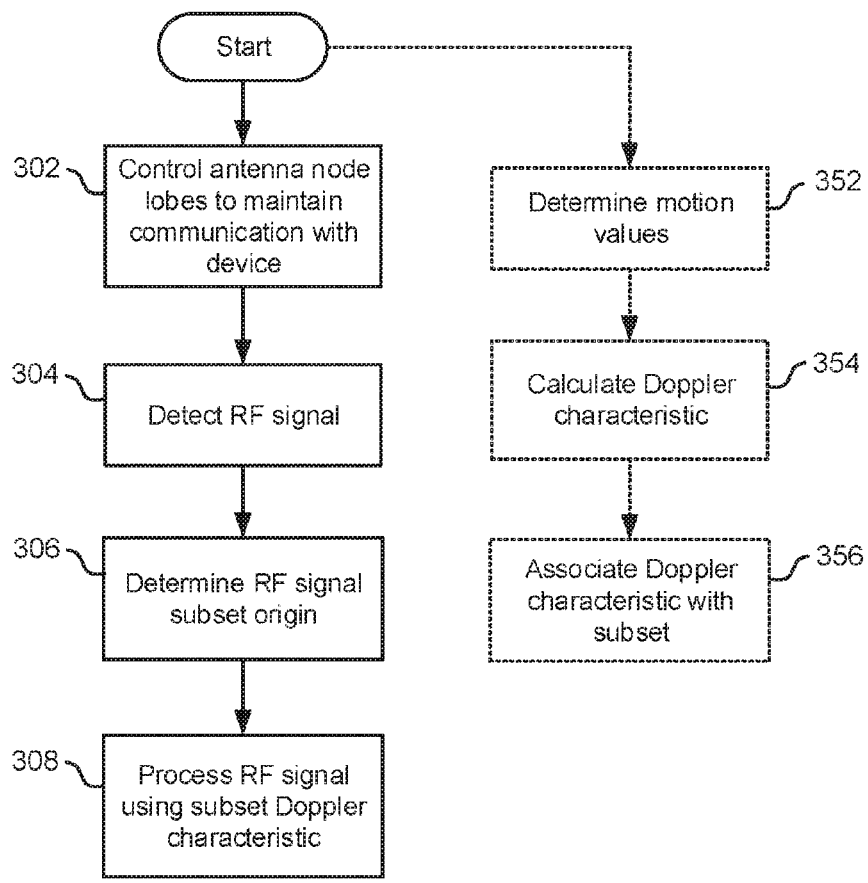
FIG. 3 is a flowchart of a method, FIG. 4 schematically illustrates a wireless communication system, FIG. 5 schematically illustrates functional blocks in a network node and in antenna nodes, FIG. 6 schematically illustrates a network node, and FIG. 7 schematically illustrates a network node.

Referring now to FIG. 2, a network node 200 is connected to a plurality of antenna nodes 210, 220, 230 that are located along a path 205 where a plurality of wireless communication devices, including a wireless communication device 201, are located, the wireless communication device 201 may be in motion as indicated by a velocity vector 202 in a first movement direction and a velocity vector 203 in a second movement direction that is opposite the first movement direction. FIG. 3 further illustrates a plurality of other wireless communication devices, including groups or subsets 261, 263, 265 of wireless communication devices that are located such that they are either moving or being more or less stationary, i.e. non-moving, as discussed above.

The antenna nodes 210, 220, 230 are controlled to maintain a respective reception radio lobe 211, 221, 231. As the skilled person will realize, the antenna nodes 210, 220, 230 may also maintain respective transmission radio lobes. Such transmission radio lobes are omitted from FIG. 2 for the sake of avoiding unnecessary detail when illustrating the embodiments of the present disclosure. The lobes 211, 221, 231 are substantially along the path 205 such that the wireless communication device 201 during movement along the path 205, can communicate with the network node 200 via consecutive reception radio lobes. When moving in the direction defined by velocity vector 202, the wireless communication device 201 communicates via consecutive reception radio lobes 231, 221, 211 of consecutive antenna nodes 230, 220, 210 behind the wireless communication device 201. Conversely, when moving in the direction defined by velocity vector 203, the wireless communication device 201 communicates via consecutive reception radio lobes 211, 221, 231 of consecutive antenna nodes 210, 220, 230 ahead of the wireless communication device 201. When moving in any direction 201, 202 RF signals transmitted by the wireless communication device 201 will be subject to a Doppler frequency shift when detected via a reception radio lobe maintained by an antenna node such as any of the antenna nodes 210, 220, 230.

As indicated in FIG. 2, it is to be noted that the network node 200 may be considered as a single entity as well as a combination of a plurality of entities 240. For example, the network node 200 may be distributed, in terms of functionality as well as in terms of physical hardware, over one or more processing units that are residing in a logical entity 250 that may be defined as a "cloud".

As will be exemplified below, the network node 200 may also be in the form of a node in a 3GPP long term evolution (LTE) system.

Figure 1:
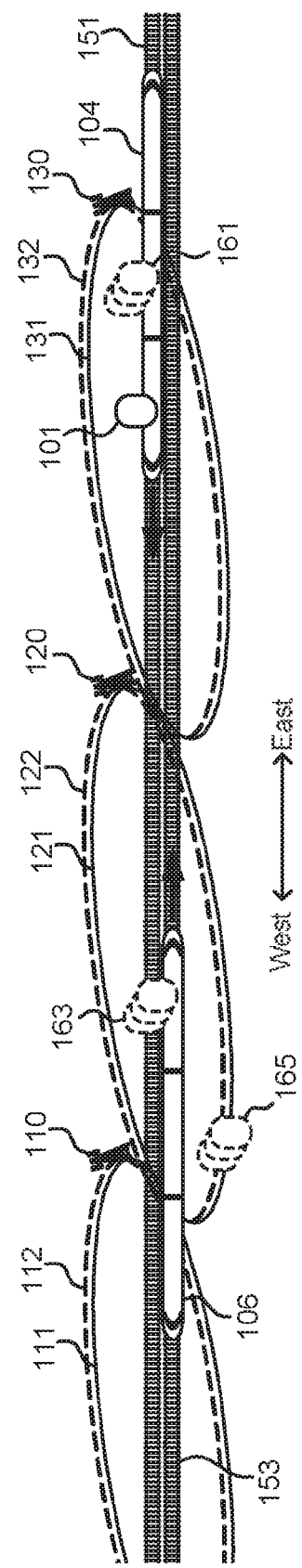
FIG. 1 schematically illustrates a HST scenario.

In the embodiments to be described below, the network node 200 detects that wireless devices are moving at the same speed or being stationary and uses this information to assign each particular wireless communication device to a group (i.e. subset). The network node 200 may determine this according to several methods in prior art, and in this scenario it is particularly simple since wireless communication devices moving at speed are constrained to move along certain paths, i.e., the railway tracks (e.g. tracks 151, 153 in FIG. 1). The network node may 200 detect one or more moving groups of wireless communication devices depending on track layout and whether the network is open for access also by wireless communication devices not traveling on board trains, e.g. maintenance workers, passengers waiting at stations, etc. The network node 200 monitors the wireless communication devices and should a wireless communication device deviate from the characteristics of the group to which it is assigned, the network node 200 may reassign it to a more suitable group. For instance, a wireless communication device leaving a train at a station is moved from a "moving group" to a "stationary group", and vice versa.

Turning now to FIG. 3, and with continued reference to FIG. 2, a method will be described with reference to a number of actions that are performed by a network node, such as the network node 200.

Action 302

The antenna nodes 210, 220, 230 are controlled to maintain a respective reception radio lobe 211, 221, 231. The lobes 211, 221, 231 are substantially along the path 205 such that the wireless communication devices 201, 261, 263 can communicate with the network node 200 via the reception radio lobes 211, 221, 231.

Action 304

A detection is made of a radio frequency (RF) signal.

Action 306

A determination is made that the detected RF signal, in action 302, originates from a wireless communication device 201 of a specific subset among the plurality of wireless communication devices, the specific subset comprising wireless communication devices that are associated with a common Doppler radio frequency characteristic.

For example, the determination that the detected RF signal originates from a wireless communication device 201 of a specific subset may comprise an analysis of the detected RF signal in terms of at least a frequency envelop.

In case the network node is the entity that is responsible for scheduling the wireless communication device from which the signal is received, then the network will have a-priori knowledge of the wireless communication device and thus it will know which subset or group the wireless communication device belongs.

For example, a scenario may involve contention-based random access where wireless communication devices are located on-board high speed trains that are moving along one or more railway tracks. Then, the wireless communication devices are transmitting preambles in a PRACH and the network node may use prior knowledge on groups and associated frequency offsets when correlating with a received PRACH preamble and thereby determine which specific subset a wireless communication device belongs to. This is based on the preconception that it is likely that there are already connected wireless communication devices on-board the train.

In other alternatives, the network node may know that it serves two meeting railway tracks (e.g. such as the scenario illustrated in FIG. 1) as well as an area along the railway tracks. Then there may be three groups defined by wireless communication devices moving along each railway track (in opposite directions) and one non-moving group of wireless communication devices located at, e.g., a station platform. In such a "three group" scenario, the network node will know a priori that there is an average offset of 0 Hz. But in case there is only one of the two "moving train groups" defined, the network node does not know all the three potential frequency offsets. It may then use the two prior known offsets and hypothesize a third offset for the unknown group, where the third offset has an opposite sign to the second offset (defined train group). The purpose of this is just to allow the PRACH preamble to be accurately detected. Once the wireless communication device sends a radio resource control (RRC) Connection request message (being part of the random access procedure) the network node can estimate a more accurate frequency offset from the received signal, i.e., there is no ambiguity in the RRC signalling, only in the initial PRACH preamble.

Action 308

The detected RF signal is then processed, the processing comprising a utilization of the Doppler radio frequency characteristic that is associated with the specific subset of wireless communication devices.

As will be discussed in some detail below, the base station (e.g. the network node 200 or the network node 200 co-operating with an antenna node 210, 220, 230) may use many characteristics of a received signal to determine common frequency offset characteristics of a group of wireless communication devices. The frequency envelope of a detected RF signal will fade with a certain main frequency that can be converted to speed given the base station (e.g. network node 200) knowledge of the nominal center frequency used. The base station (e.g. network node 200) can also in some cases directly compare the received frequency with the nominal frequency. This gives an estimate of speed.

The network (e.g. network node 200) has a priori knowledge of which cells belong to high speed zones, like a railroad track. Wireless communication devices which have an estimated speed above a threshold and belong to a high speed zone are flagged and grouped according to their speed in different intervals. The base station receiver (e.g. network node 200 co-operating with an antenna node 210, 220, 230) may use this knowledge to tune the reception in order to mitigate the reception problems caused by the high speed.

Some embodiments involve sequences of actions 352, 354, 356 that can be seen as a process of maintaining or keeping track of one or more subsets of wireless communication devices located along the path 305. As FIG. 2 illustrates, such subsets or groups 261, 263, 265 of wireless communication devices may be located such that they are either moving or being more or less stationary, i.e. non-moving, as discussed above.

Action 352

A determination is made of a respective motion value representative of motion of at least one subset of wireless communication devices.

For example, the determination of a respective motion value may comprise a determination of a forward motion value representative of motion, in a forward direction 202 along the path, of a forward moving subset of wireless communication devices. Moreover, the determination of a respective motion value may also, or alternatively, comprise a determination of a reverse motion value representative of motion, in a reverse direction 203 opposite the forward direction 202 along the path, of a reverse moving subset of wireless communication devices.

In some embodiments, the determination of a respective motion value may comprise a determination of a third motion value representative of non-motion of a non-moving subset of wireless communication devices. As mentioned, non-motion is to be understood as including motion at a low speed, i.e. low speed in relation to a speed of, e.g., a high speed train as discussed above. For example, walking speed is to be considered as a low speed.

In some embodiments, the determination of a respective motion value may comprise obtaining the respective motion value from predetermined information available to the network node. Such predetermined information may comprise information associated with geographic locations of antenna nodes 210, 220, 230 in relation to the path 205.

In some embodiments, the determination of a respective motion value may comprise an analysis of detected RF signals, comprising an analysis of frequency characteristics.

Action 354

Based on the respective motion value, a calculation is made of a respective Doppler radio frequency characteristic that is representative of the at least one subset of wireless communication devices.

Action 356

The respective Doppler radio frequency characteristic is then associated with the at least one subset of wireless communication devices.

Instead of determining a motion value in order to obtain a Doppler radio frequency characteristic, in some embodiments the Doppler radio frequency characteristic may be determined in a more direct manner. For example, in case of there being a line of sight between transmitting wireless communication devices and an antenna node receiving RF signals from these, the Doppler radio frequency characteristic can be measured from the difference between a transmitted (by an antenna node under the control of the network node) and a received radio frequency. Furthermore, in case of a non-line of sight situation, there is a Doppler spread corresponding to the speed giving fading, which also can be estimated.

The embodiments herein provide advantages over prior art wireless communication systems, for example by the fact that they restrict the frequency offsets to take into account to one or a few cases. For example, in case of service provided exclusively to passengers on-board a train, and single track: all wireless communication devices to account for display the same frequency offset characteristics. Further, in case of publicly provided service and single railway track, allowing e.g. maintenance workers along the tracks to connect to the network: the wireless communication device belongs to either of two groups, where within each group all wireless communication devices display the same frequency offset characteristics. Also, in case of service provided exclusively to passengers on-board a train, and double tracks: the wireless communication device belongs to either of two groups, where within each group all UEs display the same frequency offset characteristics. Further, in case of publicly provided service, and double tracks: UE belongs to either of three groups, where within each group all UEs display the same frequency offset characteristics, and so on for other combinations of admission and number of tracks.

The embodiments reduce the complexity of the network node processing and reduce missed and false PRACH detections, respectively. As a result, the system performance can be improved without dramatically increasing the processing complexity.

Specifically, with regard to the processing in action 308 that comprises a utilization of the Doppler radio frequency characteristic that is associated with the specific subset of wireless communication devices, with regard to embodiments where the network node 200 is carrying out PRACH detection, it may take into account the groups of wireless communication devices and the associated Doppler characteristics. With only a single group of wireless communication devices, and where the group is associated with a frequency offset, the PRACH detection procedure comprises processing that takes into account/compensates for the frequency offset. Take into account may here mean for instance translation in frequency of received signals before demodulation (i.e., digital frequency offset compensation), or rotation of the PRACH sequences used in the correlation, with e.g. the Zadoff-Chu sequences, to compensate for shifted subcarrier positions in the received signals. Hence with a single group of wireless communication devices there is only one frequency offset to take into account.

In case there are two or more groups, e.g. "moving east", "moving west", "stationary", simultaneously active in that particular cell (e.g. in one particular ULRX lobe), the network node 200 may take all the associated frequency offsets into account when detecting contention-based RA attempts. This has an effect of improving the detection performance since other subcarrier shifts, not corresponding to any of the groups, are ignored.

For contention-free RA, it only takes into account the particular frequency shift associated with the group to which the wireless communication device is assigned, thereby reducing the chance for false detection, and also reduces missed detections since the detection results are not obscured by false correlations for the same PRACH sequence but for another group than the wireless communication device belongs to.

Further, with regard to the processing in action 308 that comprises a utilization of the Doppler radio frequency characteristic that is associated with the specific subset of wireless communication devices, with regard to embodiments involving processing of PUCCH and PUSCH, the network node 200 may improve the CINR when processing PUCCH and PUSCH. Before processing signals associated with a certain wireless communication device belonging to a certain group, the network node 200 may compensate for the associated frequency offset characteristics, e.g. via digital frequency offset compensation before demodulation. In case of a single group the compensation applies for all wireless communication devices. In case of several groups, the compensation can be repeated e.g. once per group. It is thereby avoided that the network node 200 has to apply a unique compensation for each wireless communication device. The network node 200 may frequency compensate PUCCH and PUSCH for characteristics associated with one of the groups, demodulates and decodes the received signals (Group A). The next group may be handled by, e.g., determining the fast Fourier transform (FFT) leakage amplitude and phase caused when demodulating Group B with frequency offset adjusted for Group A. Here, determining may mean e.g. deriving mathematically, estimating from UL reference signals (UL RSIG), using precomputed values e.g. the leakage caused by Group B to Group A frequency offsets in steps of 100 Hz, etc.

Alternatively, the next group (Group B) may be handled by any of describing the dominating leakage to nearby subcarriers as a finite impulse response (FIR) filter acting in the frequency domain, deriving an inverse filter to said FIR filter, subjecting the resource elements associated with Group B to said inverse filter in the frequency domain, combining and decoding the messages from UEs in Group B, and so on.

To summarize, embodiments of methods described above may comprise:

a) Determining that a wireless communication device belongs to a group of wireless communication devices, b) Determining the common frequency offset characteristics (or other common characteristics that have an impact on the ULRX) of said group of wireless communication devices, and c) Adapting the ULRX processing to mitigate the common characteristics of the group to which a wireless communication device belongs.

Figure 4:
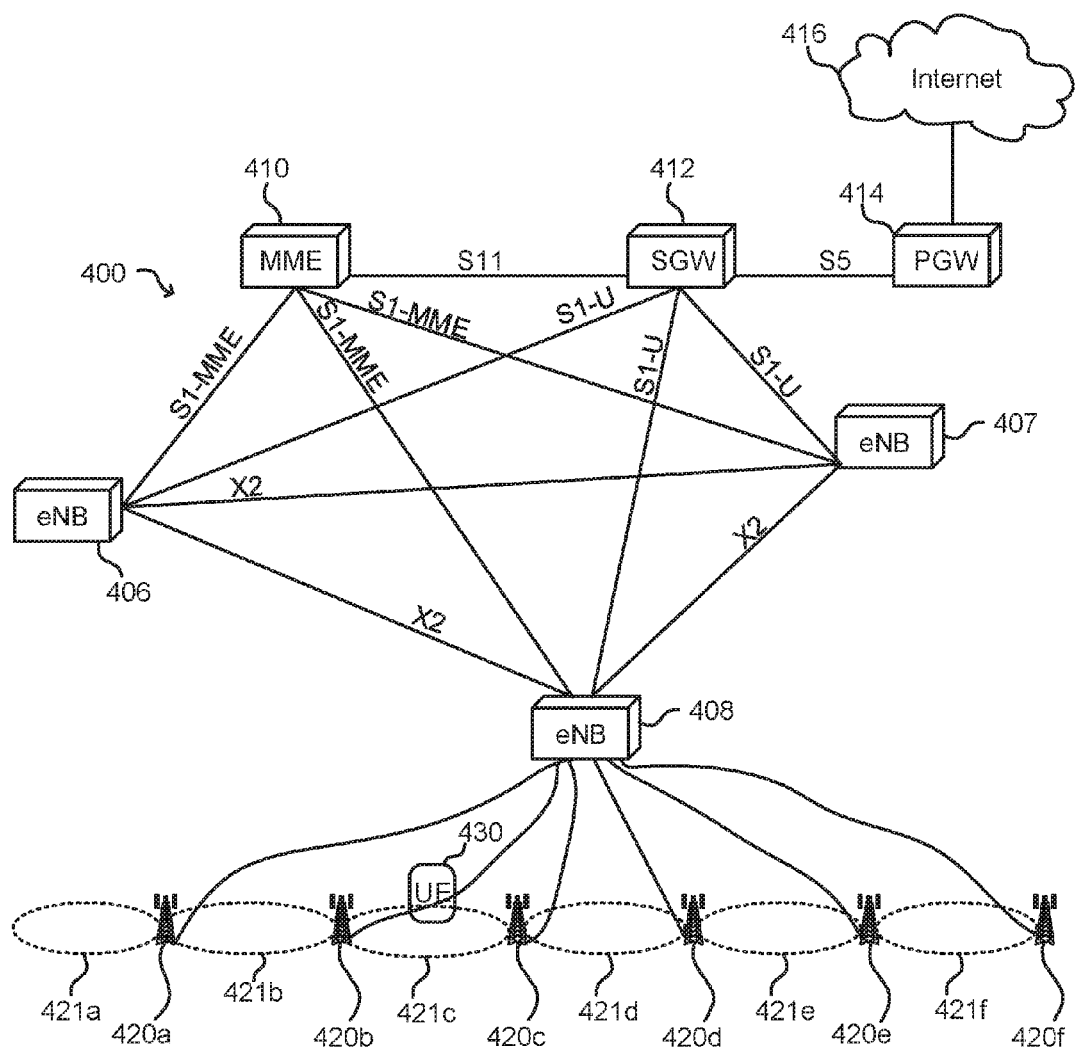

Turning now to FIG. 4, which illustrates parts of a 3GPP long term evolution, LTE, wireless network 400 and a compatible core network. Base stations (enhanced NodeB, eNodeB or eNB) 406, 407, 408 are communicating with each other over an X2 interface. The base stations 406, 407 and 408 are connected to a mobility management entity, MME, 410, which keeps information about UEs (i.e. UE contexts) regarding capabilities etc., which the MME 410 shares, e.g., with base stations connected to it. The MME 410 is also managing handover of a UE from one MME to another when a UE leaves the pool of base stations managed by a source MME, or when the X2 connection is missing between the source and target base stations.

The base stations 406, 407 and 408 are further connected to a serving gateway, SGW, 412, which is handing the user data plane transport to and from the base station to which a UE is connected, and to one or more packet data network gateways, PGW, 414, which connect UEs to the internet 416. The MME in whose pool of base stations a UE resides configures which base station the SGW shall connect to for transport of the UE user plane data.

In FIG. 4, the base station 408 is a network node as defined above and the base station/network node 408 is connected to a number of antenna nodes 420a-f. The base station/network node 408 controls the antenna nodes 420a-f as discussed herein and thereby maintaining respective radio lobes 421a-f. A UE 430 is illustrated, which may correspond to any wireless communication device described herein.

Processing of ULRX signals, as exemplified above, may be handled by a single network node such as an eNodeB (as indicated in FIG. 4) using antenna nodes in the form of remote radio heads, RRH, or remote radio units, RRU, for the individual radio lobes 421a-f. Processing of ULRX signals may in other embodiments be handled by a group of eNodeBs with or without RRHs or RRUs operating in a cooperative manner, or such group of eNodeBs under coordination of another network node, either a new entity or an existing one with extended functionality, e.g. an MME.

Figure 5:
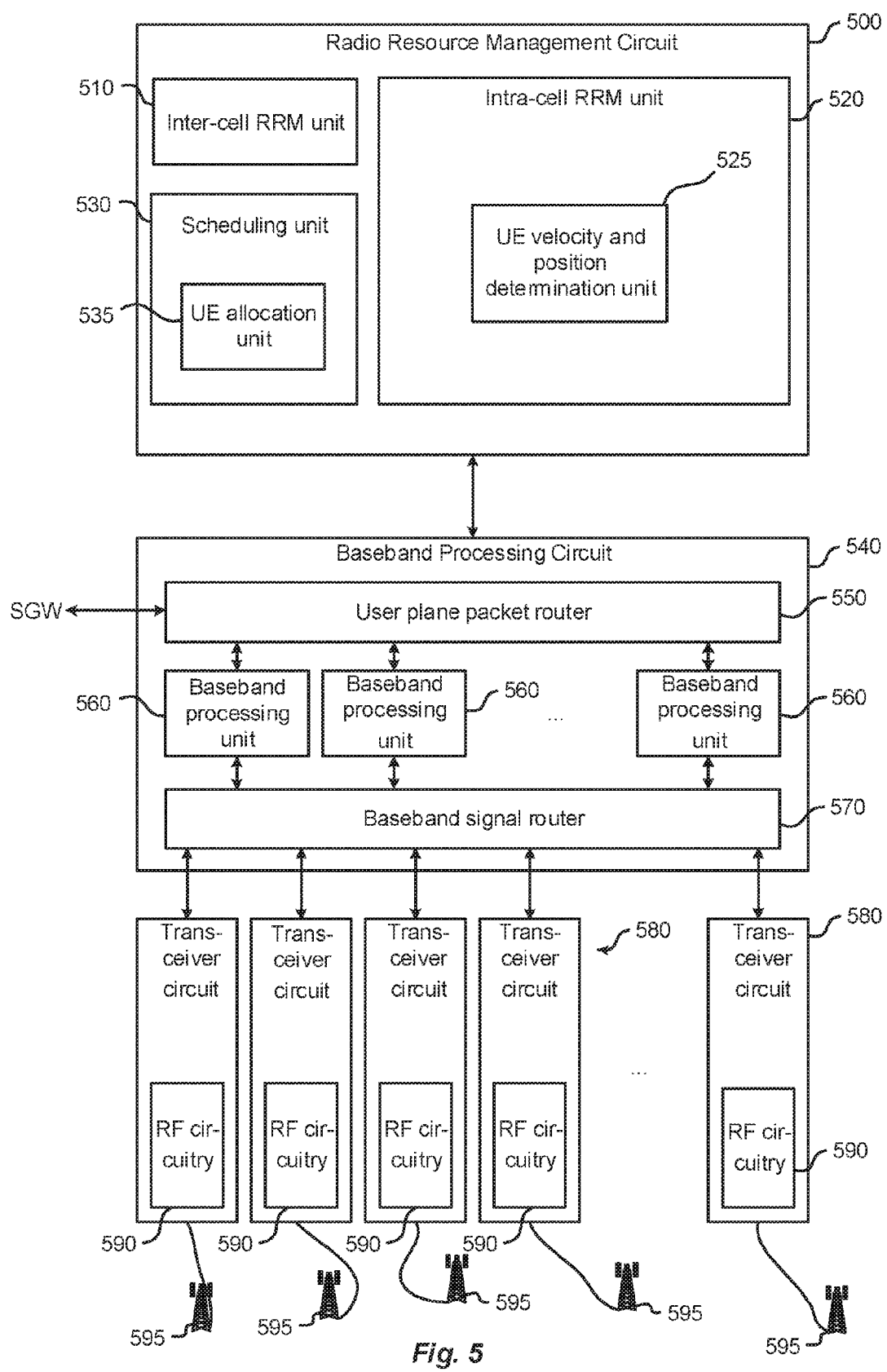

Turning now to FIG. 5, an example of arrangements, in the form of functional blocks, in a network node will be described in some more detail. The arrangements in FIG. 5 may be comprised in any of the network nodes discussed above in connection with FIGS. 2 and 4.

A radio resource management (RRM) circuit 500 comprises an Inter-cell RRM unit 510 for handling information and processing in relation to mobility of wireless communication devices between cells in a wireless communication network, e.g. a single frequency network (SFN), where cells may have one and the same or different physical cell identities.

An intra-cell RRM unit 520 is comprised in the RRM circuit 500, the intra-cell RRM unit 520 being capable of handling information and processing in relation to mobility within a cell (e.g. part of a SFN cell) managed by this network node, e.g. eNodeB.

A scheduling unit 530 is configured, in addition to scheduling operations that are outside of the present disclosure, to handle scheduling of communication as described herein.

The Intra-RRM unit further comprises a velocity and position determination unit 525 that is configured to determine position and velocity of wireless communication devices based on various kinds of measurements (e.g. as discussed herein).

A baseband processing unit 540 comprises one or more baseband processing units 560 connected to a SGW via a user plane packet router 550, and connected to transceiver circuits 580 comprising RF circuitry 590 via a baseband signal router 570. Connection with antenna nodes 595 is realized via the transceiver circuits 580.

Figure 6:
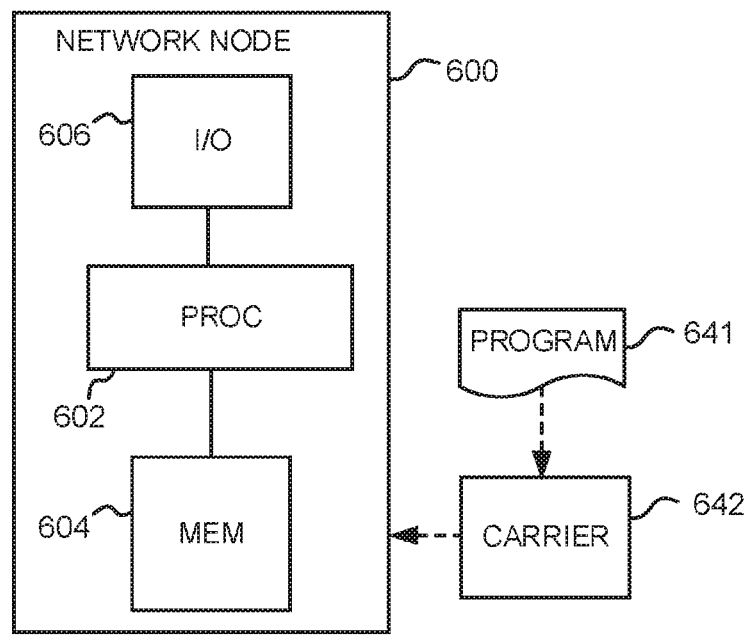

Turning now to FIG. 6, a schematically illustrated network node 600 will be described in some more detail. The network node 600 is configured to be connected to a plurality of antenna nodes that are located along a path where a plurality of wireless communication devices are located. The network node 600 comprises input/output circuitry 606, a processor 602 and a memory 604. The memory 604 contains instructions executable by the processor 602 whereby the network node 600 is operative to:

control the antenna nodes to maintain reception radio lobes substantially along the path such that the wireless communication devices can communicate with the network node via the reception radio lobes, detect a radio frequency, RF, signal, determine that the detected RF signal originates from a wireless communication device of a specific subset among said plurality of wireless communication devices, said specific subset comprising wireless communication devices that are associated with a common Doppler radio frequency characteristic, and process the detected RF signal, said processing comprising a utilization of said Doppler radio frequency characteristic that is associated with said specific subset of wireless communication devices.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the network node 600 operative such that the determination that the detected RF signal originates from a wireless communication device of a specific subset comprises:

analysing the detected RF signal in terms of at least a frequency envelop.

In some embodiments, the network node 600 is operative such that the determination that the detected RF signal originates from a wireless communication device of a specific subset comprises:

utilizing a-priori information available to the network node.

In some embodiments, the network node 600 is operative to:

determine a respective motion value representative of motion of at least one subset of wireless communication devices, calculate, based on said respective motion value, a respective Doppler radio frequency characteristic that is representative of said at least one subset of wireless communication devices, and associate said respective Doppler radio frequency characteristic with said at least one subset of wireless communication devices.

In some embodiments, the network node 600 is operative such that the determination of a respective motion value comprises determining a forward motion value representative of motion, in a forward direction along the path, of a forward moving subset of wireless communication devices.

In some embodiments, the network node 600 is operative such that the determination of a respective motion value comprises determining a reverse motion value representative of motion, in a reverse direction opposite the forward direction along the path, of a reverse moving subset of wireless communication devices.

In some embodiments, the network node 600 is operative such that the determination of a respective motion value comprises determining a third motion value representative of non-motion of a non-moving subset of wireless communication devices.

In some embodiments, the network node 600 is operative such that the determination of a respective motion value comprises:

obtaining the respective motion value from predetermined information available to the network node, said predetermined information comprising information associated with geographic locations of antenna nodes in relation to the path.

In some embodiments, the network node 600 is operative such that the determination of a respective motion value comprises:

analysing detected RF signals, comprising an analysis of frequency characteristics.

In some embodiments, the network node 600 is operative such that the processing of the detected RF signal comprises frequency compensating during physical random access channel, PRACH, detection by any of:

frequency translation prior to demodulation, and rotation of PRACH sequences.

In some embodiments, the network node 600 is operative such that the processing of the detected RF signal comprises frequency compensating during processing of any of physical uplink control channel, PUCCH, and physical uplink shared channel, PUSCH, by any of:

frequency offset compensation prior to demodulation, and frequency offset compensation subsequent to demodulation.

Figure 7:
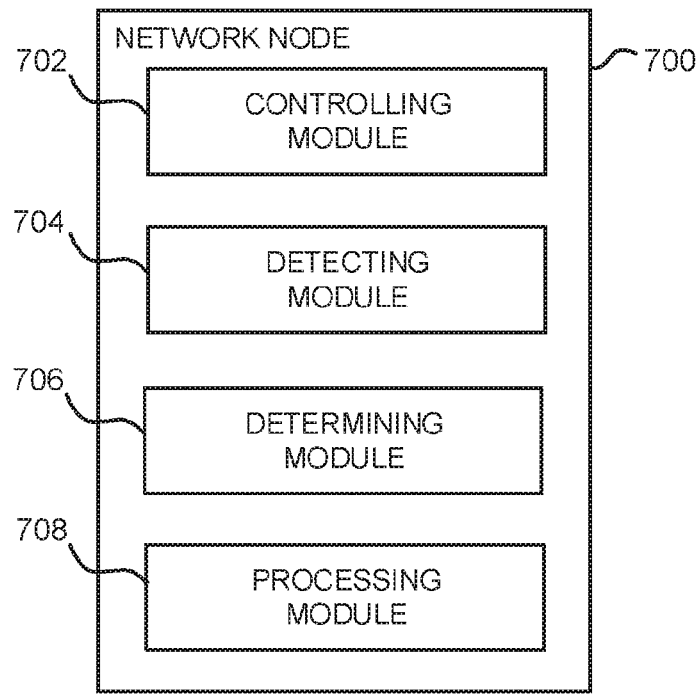

FIG. 7, illustrates schematically a network node 800 that comprises:

a controlling module 702 configured to control the antenna nodes to maintain reception radio lobes substantially along the path such that the wireless communication devices can communicate with the network node via the reception radio lobes, a detecting module 704 configured to detect a radio frequency, RF, signal, a determining module 706 configured to determine that the detected RF signal originates from a wireless communication device of a specific subset among said plurality of wireless communication devices, said specific subset comprising wireless communication devices that are associated with a common Doppler radio frequency characteristic, and a processing module 708 configured to process the detected RF signal, said processing comprising a utilization of said Doppler radio frequency characteristic that is associated with said specific subset of wireless communication devices.

The network node 700 may comprise further modules that are configured to perform in a similar manner as, e.g., the network node 600 described above in connection with FIG. 6.

In case it is not clear from the context in which they appear, below follows a summary of abbreviations of some of the technical terms used in the description above.

| Abbreviation | Explanation |
| --- | --- |
| BBPU | Baseband processing unit |
| C-RNTI | Cell radio network temporary identifier |
| DL | Downlink |
| DRX | Discontinuous reception |
| eNB | evolved NodeB |
| FDD | Frequency division duplex |
| FFT | Fast Fourier transform |
| HST | High speed train |
| PRACH | Physical random access channel |
| PUCCH | Physical uplink control channel |
| PUSCH | Physical uplink shared channel |
| RA | Random access |
| RAU | Remote antenna unit |
| RLF | Radio link failure |
| RRH | Remote radio head |
| Rx | Receive(r) |
| SFN | Single Frequency Network |
| SG | Scheduling grant |
| SR | Scheduling request |
| TA | Timing advance |
| TDD | Time division duplex |
| TRx | Transceiver |
| Tx | Transmit(ter) |
| UE | User equipment |
| UL | Uplink |

The invention claimed is:

1. A method performed by a network node, where the network node is connected to a plurality of antenna nodes that are located along a path where a plurality of wireless communication devices are located, the method comprising:

controlling the plurality of antenna nodes to maintain reception radio lobes substantially along the path such that the plurality of wireless communication devices can communicate with the network node via the reception radio lobes;

detecting a radio frequency (RF) signal;

determining that the detected RF signal originates from a wireless communication device of a specific subset among said plurality of wireless communication devices, said specific subset comprising wireless communication devices that are associated with a common Doppler radio frequency characteristic; and processing the detected RF signal, said processing comprising a utilization of said Doppler radio frequency characteristic that is associated with said specific subset of wireless communication devices.

2. The method of claim 1, wherein the determination that the detected RF signal originates from the wireless communication device of the specific subset comprises analyzing the detected RF signal in terms of at least a frequency envelope.

3. The method of claim 1, wherein the determination that the detected RF signal originates from the wireless communication device of the specific subset comprises utilizing a-priori information available to the network node.

4. The method of claim 1, comprising:

determining a respective motion value representative of motion of at least one subset of wireless communication devices;

calculating, based on said respective motion value, a respective Doppler radio frequency characteristic that is representative of said at least one subset of wireless communication devices; and associating said respective Doppler radio frequency characteristic with said at least one subset of wireless communication devices.

5. The method of claim 4, wherein the determination of the respective motion value comprises determining a forward motion value representative of motion, in a forward direction along the path, of a forward moving subset of wireless communication devices.

6. The method of claim 4, wherein the determination of the respective motion value comprises determining a reverse motion value representative of motion, in a reverse direction opposite a forward direction along the path, of a reverse moving subset of wireless communication devices.

7. The method of claim 4, wherein the determination of the respective motion value comprises determining a third motion value representative of non-motion of a non-moving subset of wireless communication devices.

8. The method of claim 4, wherein the determination of the respective motion value comprises obtaining the respective motion value from predetermined information available to the network node, said predetermined information comprising information associated with geographic locations of the plurality of antenna nodes in relation to the path.

9. The method of claim 4, wherein the determination of the respective motion value comprises analyzing detected RF signals, comprising an analysis of frequency characteristics.

10. The method of claim 1, wherein the processing of the detected RF signal comprises frequency compensating during physical random access channel (PRACH) detection by any of:

frequency translation prior to demodulation, and
rotation of PRACH sequences.

11. The method of claim 1, wherein the processing of the detected RF signal comprises frequency compensating during processing of any of physical uplink control channel (PUCCH) and physical uplink shared channel (PUSCH) by any of:

frequency offset compensation prior to demodulation, and
frequency offset compensation subsequent to demodulation.

12. A network node configured to be connected to a plurality of antenna nodes that are located along a path where a plurality of wireless communication devices are located, the network node comprising input/output circuitry, a processor and a memory, said memory containing instructions executable by said processor whereby said network node is operative to:

control the plurality of antenna nodes to maintain reception radio lobes substantially along the path such that the plurality of wireless communication devices can communicate with the network node via the reception radio lobes;

detect a radio frequency (RF) signal;

determine that the detected RF signal originates from a wireless communication device of a specific subset among said plurality of wireless communication devices, said specific subset comprising wireless communication devices that are associated with a common Doppler radio frequency characteristic; and process the detected RF signal, said processing comprising a utilization of said Doppler radio frequency characteristic that is associated with said specific subset of wireless communication devices.

13. The network node of claim 12, wherein the processor and memory are configured such that the determination that the detected RF signal originates from the wireless communication device of the specific subset comprises analyzing the detected RF signal in terms of at least a frequency envelope.

14. The network node of claim 12, wherein the processor and memory are configured such that the determination that the detected RF signal originates from the wireless communication device of the specific subset comprises utilizing a-priori information available to the network node.

15. The network node of claim 12, wherein the processor and memory are configured to:

determine a respective motion value representative of motion of at least one subset of wireless communication devices;

calculate, based on said respective motion value, a respective Doppler radio frequency characteristic that is representative of said at least one subset of wireless communication devices; and associate said respective Doppler radio frequency characteristic with said at least one subset of wireless communication devices.

16. The network node of claim 15, wherein the processor and memory are configured such that the determination of the respective motion value comprises determining a forward motion value representative of motion, in a forward direction along the path, of a forward moving subset of wireless communication devices.

17. The network node of claim 15, wherein the processor and memory are configured such that the determination of the respective motion value comprises determining a reverse motion value representative of motion, in a reverse direction opposite a forward direction along the path, of a reverse moving subset of wireless communication devices.

18. The network node of claim 15, wherein the processor and memory are configured such that the determination of the respective motion value comprises determining a third motion value representative of non-motion of a non-moving subset of wireless communication devices.

19. The network node of claim 15, wherein the processor and memory are configured such that the determination of the respective motion value comprises:

obtaining the respective motion value from predetermined information available to the network node, said predetermined information comprising information associated with geographic locations of the plurality of antenna nodes in relation to the path.

20. The network node of claim 15, wherein the processor and memory are configured such that the determination of the respective motion value comprises analyzing detected RF signals, comprising an analysis of frequency characteristics.

21. The network node of claim 12, wherein the processor and memory are configured such that the processing of the detected RF signal comprises frequency compensating during physical random access channel (PRACH) detection by any of:

frequency translation prior to demodulation, and rotation of PRACH sequences.

22. The network node of claim 12, wherein the processor and memory are configured such that the processing of the detected RF signal comprises frequency compensating during processing of any of physical uplink control channel (PUCCH) and physical uplink shared channel (PUSCH) by any of:

frequency offset compensation prior to demodulation, and frequency offset compensation subsequent to demodulation.

23. A non-transitory computer-readable medium comprising, stored thereupon, a computer program comprising instructions that, when executed on at least one processor in a network node that is connected to a plurality of antenna nodes that are located along a path where a plurality of wireless communication devices are located, cause the network node to:

control the plurality of antenna nodes to maintain reception radio lobes substantially along the path such that the plurality of wireless communication devices can communicate with the network node via the reception radio lobes;

detect a radio frequency (RF) signal;

determine that the detected RF signal originates from a wireless communication device of a specific subset among said plurality of wireless communication devices, said specific subset comprising wireless communication devices that are associated with a common Doppler radio frequency characteristic; and process the detected RF signal, said processing comprising a utilization of said Doppler radio frequency characteristic that is associated with said specific subset of wireless communication devices.

* * * * *